(12) United States Patent
Liter

(10) Patent No.: US 9,717,385 B2
(45) Date of Patent: *Aug. 1, 2017

(54) APPARATUS AND METHOD OF UTILIZING WIRELESS SWITCHES TO CONTROL A VACUUM CLEANER

(71) Applicant: Techtronic Floor Care Technology Limited, Tortola (VG)

(72) Inventor: Charles Andrew Liter, Cookeville, TN (US)

(73) Assignee: Techtronic Floor Care Technology Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 14/876,932

(22) Filed: Oct. 7, 2015

(65) Prior Publication Data

US 2016/0022106 A1   Jan. 28, 2016

Related U.S. Application Data

(63) Continuation of application No. 13/743,301, filed on Jan. 16, 2013, now Pat. No. 9,155,439.

(51) Int. Cl.
| | |
|---|---|
| *A47L 9/00* | (2006.01) |
| *A47L 9/28* | (2006.01) |
| *A47L 9/32* | (2006.01) |
| *G05B 15/02* | (2006.01) |

(52) U.S. Cl.
CPC .......... *A47L 9/2894* (2013.01); *A47L 9/2842* (2013.01); *A47L 9/2857* (2013.01); *A47L 9/2868* (2013.01); *A47L 9/325* (2013.01); *G05B 15/02* (2013.01)

(58) Field of Classification Search
CPC ........ A47L 9/00; A47L 9/2894; A47L 9/2842; A47L 9/2857; A47L 9/2868; A47L 9/325; A47L 9/19; A47L 9/2836; A47L 9/2884; A47L 9/2873; A47L 9/2878

See application file for complete search history.

(56) References Cited

U.S. PATENT DOCUMENTS

| | | | |
|---|---|---|---|
| 5,353,468 A | * | 10/1994 | Yap .................. A45D 20/30 15/319 |
| 7,043,794 B2 | | 5/2006 | Conner et al. |
| 7,174,604 B2 | | 2/2007 | Yoo et al. |
| 7,310,603 B2 | | 12/2007 | Park et al. |
| 8,142,094 B2 | | 3/2012 | Kaleta et al. |
| 8,726,457 B2 | | 5/2014 | Liu et al. |
| 8,978,195 B2 | * | 3/2015 | Park ................. A47L 9/2857 15/319 |
| 9,155,439 B2 | * | 10/2015 | Liter ................. A47L 9/2842 |
| 2006/0235570 A1 | | 10/2006 | Jung |

(Continued)

FOREIGN PATENT DOCUMENTS

WO        2004/041052        5/2004

*Primary Examiner* — Dung Van Nguyen
(74) *Attorney, Agent, or Firm* — Michael Best & Friedrich LLP

(57) ABSTRACT

A surface cleaning apparatus, such as a vacuum cleaner, having a wireless communication and control system including two or more wireless radio frequency communication devices configured to transmit and receive control instructions and responses to control the operation of various electrical components disposed within or attached to the surface cleaning apparatus.

21 Claims, 8 Drawing Sheets

(56) References Cited

U.S. PATENT DOCUMENTS

| | | | |
|---|---|---|---|
| 2009/0038107 A1* | 2/2009 | Tiekoetter | A47L 5/362 |
| | | | 15/339 |
| 2009/0119867 A1 | 5/2009 | Senoo et al. | |
| 2012/0152280 A1* | 6/2012 | Bosses | A47L 9/2805 |
| | | | 134/6 |

* cited by examiner

APPARATUS AND METHOD OF UTILIZING WIRELESS SWITCHES TO CONTROL A VACUUM CLEANER

CROSS-REFERENCE TO RELATED APPLICATIONS

This application is a continuation of U.S. patent application Ser. No. 13/743,301, filed Jan. 16, 2013, the contents of which are incorporated herein by reference.

BACKGROUND

The principles and embodiments of the presently claimed invention relate to cleaning apparatuses and methods of controlling such cleaning apparatuses wirelessly.

Cleaning devices using air suction have been known in the art, and various modifications have been made over time to the size, shape, method of suction, and attachments for such devices. However, the various electrical components, such as motors, lights, and suction attachments have been controlled by switches requiring electrical wiring to and from the switch and component. Such requirement has limited the forms of the cleaner bodies, the positioning of the switches and components, and the distance of components from the switch, and added to the overall complexity of designs. The embodiments of the presently claimed invention overcome these problems and limitations by reducing and in some instances eliminating the restrictive hard wiring previously required, and incorporating one or more wireless controls, switches, and relays into the cleaning apparatus.

SUMMARY

The principles and embodiments of the presently claimed invention relate to wirelessly controlling the electrical components of a cleaning device that utilizes air suction to remove and collect debris.

The principles and embodiments of the presently claimed invention related to a surface cleaning apparatus, such as a vacuum cleaner, having a wireless communication and control system including two or more wireless radio frequency communication devices configured to transmit and receive control instructions and responses to control the operation of various electrical components disposed within or attached to the surface cleaning apparatus.

The principles and embodiments also relate to eliminating the need of electrical wiring between the various electrical components and the devices used to control the components to simplify designs and broaden how the various electrical and structural features are implemented within a cleaning device.

An embodiment of the claimed invention relates to a vacuum cleaner comprising at least a handle which comprises, a partially hollow body, a grasping surface, one or more control features, and a first wireless radio frequency communication device located within the partially hollow handle body; a main body; a suction source; a suction base that is pivotally or swivelly attached to the main body, and comprises an intake housing having a suction inlet and a discharge opening in fluid communication with the suction source; a power source configured to be electrically connected to the suction source; a second wireless radio frequency communication device that is configured to be in communication with the first wireless radio frequency communication device and is configured to control at least the selective application of power to the suction source, wherein the first wireless radio frequency communication device is configured to send wireless signals from the handle to the second wireless radio frequency communication device to control at least the selective application of power to the suction source; and a rigid support structure that interconnects the handle to the main body, wherein the rigid support structure may comprise solid struts in physical contact with the partially hollow handle body.

An embodiment of the claimed invention may further comprise, a battery compartment within the partially hollow handle body for receiving a replaceable battery, wherein insertion of a battery into the battery compartment electrically connects the battery to the first communication device over an electrical path, which thereby receives a supply of power separate from the power source.

Another embodiment of the claimed invention may further comprise a dirt cup removably attached to the main body and in fluid communication with the suction base when so attached, wherein the air path may pass from the suction inlet to the dirt cup and then to the suction source; and wherein the suction source and second communication device are located within the main body and in electrical connection with the motor of the suction source.

Another embodiment of the claimed invention may further comprise a debris receptacle removably attached to the main body and in fluid communication with the suction base when so attached, wherein the debris receptacle may be a dirt bag or a bagless dirt cup, and wherein the suction source and second communication device are located within the suction base, wherein the air path passes from the suction inlet to the suction source and then to the debris receptacle.

An embodiment of the claimed invention may further comprise a control signal circuit in electrical communication with the first communication device that is configured to generate control signals for transmission from the first communication device to the second communication device.

An embodiment of the claimed invention may further comprise one or more electrical components configured to be electrically connected to the power source, and a power control circuit that is configured to receive control signals from the second communication device over an electrical path, and configured to form electrical circuits between the power source and the one or more electrical components, wherein the power control circuit is configured to selectively apply power to the one or more electrical components in response to signals received from the first communication device.

An embodiment of the claimed invention may also have the power control circuit comprise one or more switches and/or regulators that separately control the formation of electrical circuits between the power source and the one or more electrical components to supply sufficient power to drive the component or otherwise allow it to function.

Another embodiment of the claimed invention may further comprise one or more electrical components, and a power control circuit integrated with the power source, wherein the integrated power control circuit and power source may be a switching mode power supply, and configured to receive control signals over an electrical path from the second communication device, and to selectively apply power to the one or more electrical components in response to signals received from the first communication device, wherein the one or more electrical components is selected from the group consisting of electric motors, incandescent lights, LEDs, and sensors.

Another embodiment of the claimed invention may further comprise one or more electrical components, and a power control circuit integrated with the power source and the second communication device.

An embodiment of the claimed invention may also have the first communication device and the second communication device communicate using a communication protocol, where the control signal circuit generates digital instructions that includes information to specifically identify the control signal circuit that is transmitted by the transmitter over a particular radio frequency band.

Another embodiment of the claimed invention may also have one or more control features that are configured to provide input to the control signal circuit to control the mode of operation of the vacuum cleaner, wherein the control features on the handle can control the operation of one or more of an electric motor speed, a brush roll rotation, a light, an LED, the suction base height, and air path diverter positioning.

Another embodiment of the claimed invention may also have the control signal circuit generate unique digital instruction codes to control the operation of one or more of an electric motor speed, brush roll rotation, a light, an LED, the suction base height, and air path diverter positioning.

Another embodiment of the claimed invention may also have the instruction codes communicated from the first communication device to the second communication device to selectively apply power to the one or more electrical components in response to signals received from the first communication device, and the second communication device sends a response to the first communication device acknowledging the application of power to the one or more electrical components.

Another embodiment of the claimed invention may further comprise a third wireless communication device configured to provide control signals to the power source over an electrical path, wherein the second wireless communication device and the third wireless communication device communicate with the first wireless communication device over different radio frequency bands, and the second wireless communication device is configured to receive control signals for a subset of electrical components different and separate from a subset of electrical components that selectively receive power in response to signals received at the third wireless communication device.

Another embodiment of the claimed invention relates to a method of controlling a motor of a vacuum cleaner wirelessly comprising providing a radio frequency transmitter or transceiver electrically coupled to a user interface having control features; providing a power control circuit comprising at least a radio frequency receiver or transceiver and a power control circuit; generating the instructions to be sent by the transmitter based upon the manipulation of control features of the user interface; sending the instructions wirelessly from the transmitter to the receiver over a predetermined radio frequency when the control features of the user interface are activated, wherein the instructions specify the operation of the vacuum cleaner motor and causing one or more specified electrical components to perform a desired operation or action.

The term "and/or" is intended to encompass all possible combinations and permutations of any list of items or discussion of multiple features or components.

BRIEF DESCRIPTION OF THE DRAWINGS

Further features of the present invention, its nature and various advantages will become more apparent upon consideration of the following detailed description, taken in conjunction with the accompanying drawings, which are also illustrative of the best mode contemplated by the applicants, and in which like reference characters refer to like parts throughout, where.

DETAILED DESCRIPTION

Figure 1:
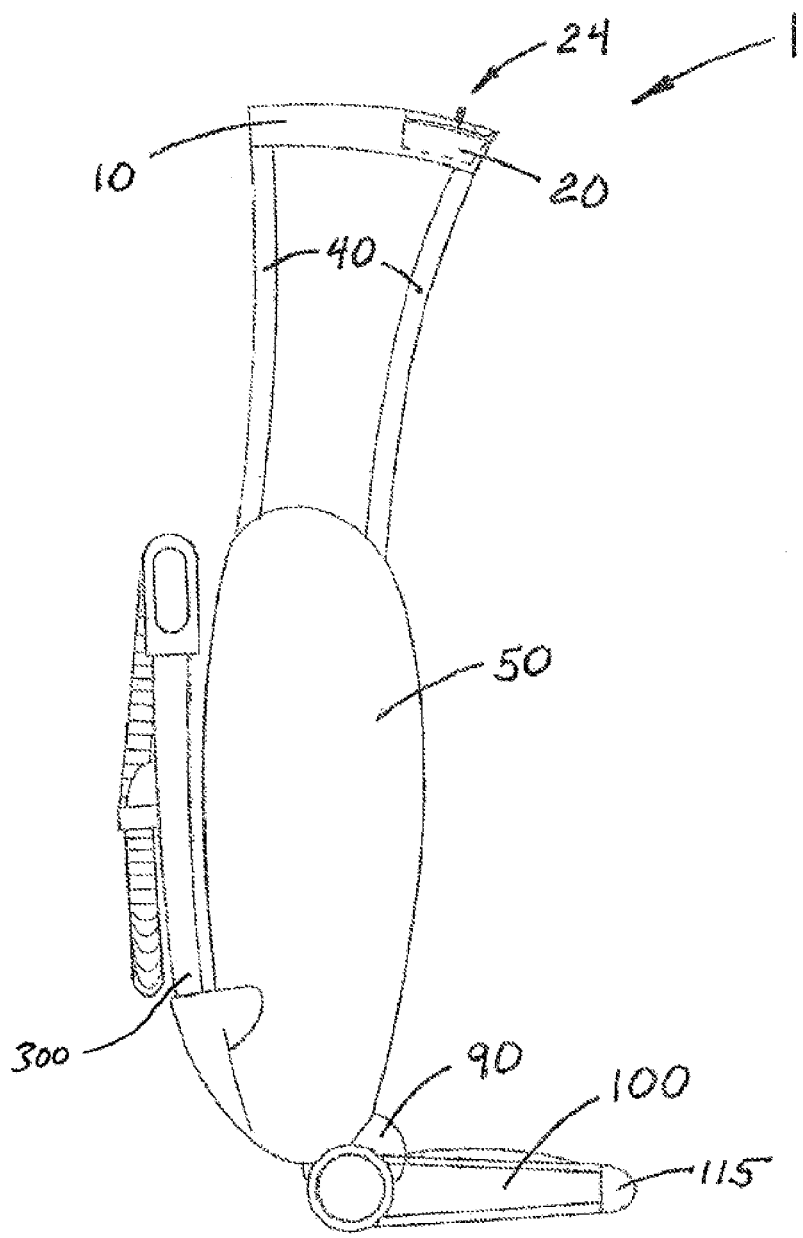
FIG. 1 is an illustration of an embodiment of a surface cleaning device.

The principles of the present invention relate to using wireless switches, remote controls, and relays to activate and deactivate electrical components of cleaning apparatuses, for example, the electric motors used to generate suction and propel beater brushes in vacuum cleaner apparatuses.

In embodiments of the present invention, a wireless switch is incorporated into the handle of a surface cleaning apparatus for controlling electrical components, including but not limited to electric motors, lights, sensors, and indicators, positioned at other locations on a cleaning apparatus that are remote from the wireless switch, where the electrical component and switch are interconnected with a power source.

In other embodiments of the presently claimed invention, one or more power sources are located adjacent to or in physical proximity with the electrical components to eliminate the need for wires and electrical connections between different sections of the cleaning apparatus. Power sources may be, but are not limited to linear power supplies, switching-mode power supplies, and batteries.

The principles of the present invention relate to communicating control signals from a wireless controller to one or more wireless receivers using a wireless communication protocol, wherein such communication protocol may be a standard based transmission protocol such as Bluetooth® or Zigbee®, Z-Wave™, or a transmission protocol developed for the current application. The control signals may include an identification portion and an operation instruction portion.

Embodiments of the claimed invention have a wireless radio frequency communication device that can be, for example, a wireless transmitter, a wireless receiver, a wireless transmitter and receiver, or a wireless transceiver. The wireless communication device may be a transceiver in which the same portions of the device's circuitry perform functions for both transmission and reception, or the wireless device may be a separate transmitter and receiver to provide a level of redundancy so that if the transmitter suffers a failed circuit component the receiver can still function, and vice versa. The combination transmitter and receiver and the transceiver provide for two way wire communication between the devices.

Other embodiments of a communication device may have only a wireless transmitter function for a first communication device and only a wireless receiver function for a second communication device, or vice versa. The arrangement of a only a wireless transmitter as the first communication device and only a receiver for the second communication device provides for only one-way communication. Such arrangement may provide a less costly embodiment, but lack added features and redundancies.

Embodiments of the invention can include a controller that comprises a printed circuit board, wherein the electronic circuitry is mounted on the printed circuit board suitable for independently controlling the operation of a plurality of electrical components using transmitted control signals, and a receiver for receiving the control signals transmitted by the controller, wherein the control circuits are suitable for processing the received radio control signals and distinguishing signals sent to or intended for different electrical components.

In embodiments of the claimed invention, wireless communication may be conducted by radio frequency (RF) transmission and reception, where the control signals are communicated from a transmitter or transceiver operatively associated with a user interface such as a switch or button, and/or a control circuit to a receiver or transceiver operatively associated with an electrical component, a power source and/or a control circuit. The radio frequency transmission can be over a single narrow frequency band, or over multiple narrow band frequencies, wherein each of the RF receivers can be set to receive a signal over one of the frequencies being transmitted to avoid interference.

In embodiments of the claimed invention, a control feature is an interface between a user and the cleaning apparatus that accepts inputs from the user and causes components of the apparatus to become energized or de-energized or otherwise function in a predetermined manner such as increasing or decreasing the voltage or amount of current flowing to a component. The control features can be switches, buttons, toggles, and/or knobs, that can be manipulated between different positions by a user. Although the term switch will be used predominantly throughout the discussion of the present invention, "switch" is intended to encompass any and all of the control features, except where a particular aspect of a different control feature is being discussed and the context would make such broader meaning unreasonable or unclear.

In a non-limiting embodiment of the presently claimed invention, an electrical switch is located in a handle of a cleaning apparatus and in electrical communication with controller circuitry, which generates control signals based on the operation of the switch and in electrical communication with a radio frequency transmitter that transmits the control signals generated by the controller circuitry to one or more radio frequency receivers that are located in other sections of the cleaning apparatus that are remote from the cleaning apparatus handle and controller circuit. Each of the one or more radio frequency receivers are in electrical communication with one or more electrical component(s), and control turning the components on and off by controlling the delivery of power from a power source to the electrical component(s).

In other embodiments there are no physical electrical connections between the controller circuits and the electrical components of the cleaning apparatus. Instead of directly controlling the flow of power to electrical components using a switch or on-off signals being sent over hardwired electrical paths, the control signals are sent by electro-magnetic waves through the air to a receiver that can cause an electrical component to become energized or de-energized. This allows solid structural components and joints to be used to inter-connect different parts of a cleaning apparatus, since electrical wire do not need to be run from a switch or controller to an electrical component.

In embodiments of the claimed invention, the handle of the cleaning apparatus can be made from a solid, rather than a tubular, material, for example, a solid molded plastic handle. In other embodiments the handle may be hollow, for example, bent metal tubing, but wires are not run along the interior of the hollow handle from the switch to the other electrical components of the cleaning apparatus.

In embodiments of the claimed invention, the cleaning apparatus may have a plurality of electrical components that require electrical energy. A single receiver may be located within the body of the apparatus to receive control signals and activate or deactivate a plurality of electrical components, or multiple receivers may be locates at different positions on the apparatus, where each receiver receives control signals for a separate electrical component. Each receiver is preferably located within the same section of the apparatus as the components being controlled.

In embodiments of the claimed invention, separate power sources can be provided physically adjacent and electrically connected to the control and transmitter to supply power to the control and transmitter. For example, a hollow cleaning apparatus handle can contain a battery compartment with electrical contacts for connection to a battery that is hardwired to a switch, a controller circuit, and a transmitter, that are located in an adjacent cavity of the same hollow handle. Electrical energy from the battery can feed the switch to generate a voltage to the control circuitry, power the circuitry for generating a control signal, and power the transmitted to send the control signal to one or more receiver(s) located in other parts of the vacuum.

In embodiments of the present invention, the cleaning apparatus is an upright vacuum, a canister vacuum, an upright steamer and/or a carpet cleaner, a wet- and dry-vac, an upright floor polisher, and/or a high-pressure washer, wherein the cleaning apparatuses may be corded or cordless. While the embodiments and non-limiting examples recite vacuum cleaners, such upright steamers and carpet cleaners can also be considered within the scope of the present invention.

Examples of different embodiments of each of the various components as well as different embodiments of the overall apparatus will now be described in more detail with reference to the figures. It should be understood that these drawings only illustrate some of the preferred embodiments, and do not represent the full scope of the present invention for which reference should be made to the accompanying claims.

FIG. 1 illustrates an exemplary vacuum cleaner 1 having a handle 10, a rigid support structure 40, a main body 50, and a suction base 100 that is pivotally or swivelly attached to the main body 50 at a coupling 90 between the main body 50 and suction base 100. In some embodiments, the coupling 90 may comprise a swivel joint. A suction source (not shown) may be provided in the main body or the suction base. Suction produced by the suction source can be delivered to a suction chamber 115 within the suction base 100. The handle 10 may be attached to the main body 50 by the rigid support structure 40. A user interface 24 may be located on the surface of the handle 10 and a first wireless radio frequency communication device 20 may be located with a hollow portion of the handle 10. The handle may have a grasping surface for comfortably holding the handle and maneuvering the vacuum cleaner. One or more additional wireless radio frequency communication device(s) (not shown) may be located in other sections of the vacuum cleaner, including the main body, the suction base, and/or in a powered vacuum attachment device.

Figure 2:
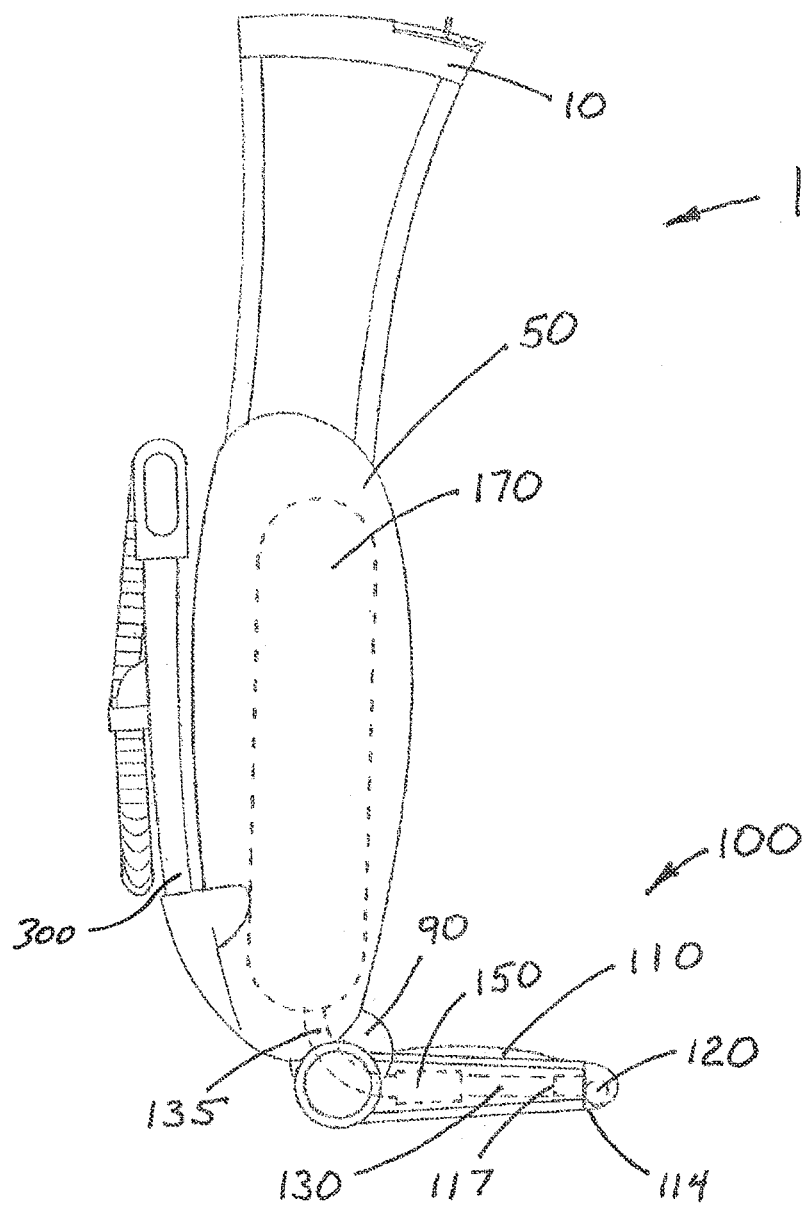
FIG. 2 is an illustration of another embodiment of a surface cleaning device.

FIG. 2 illustrates a non-limiting embodiment in which a suction source 150 is located in the suction base 100 within an intake housing 110 having a suction inlet 114 and a discharge opening 117. An agitation member 120, for example, a beater brush and/or bar may be located within the intake housing 110 at the suction inlet 114 of a suction chamber 115 to provide physical agitation or sweeping of a surface. Ducting, tubing or other forms of conduits 130 may form an enclosed air path from the discharge opening 117 of the intake housing to an inlet of the suction source. Air and debris can be expelled from an outlet of the suction source 150 into another conduit 135 leading to a debris receptacle 170 in the main body 50, where the debris receptacle may be a collection bag. In the embodiment illustrated in FIG. 2, the air path passes from the suction inlet to the suction source and then to the debris receptacle.

Figure 3:
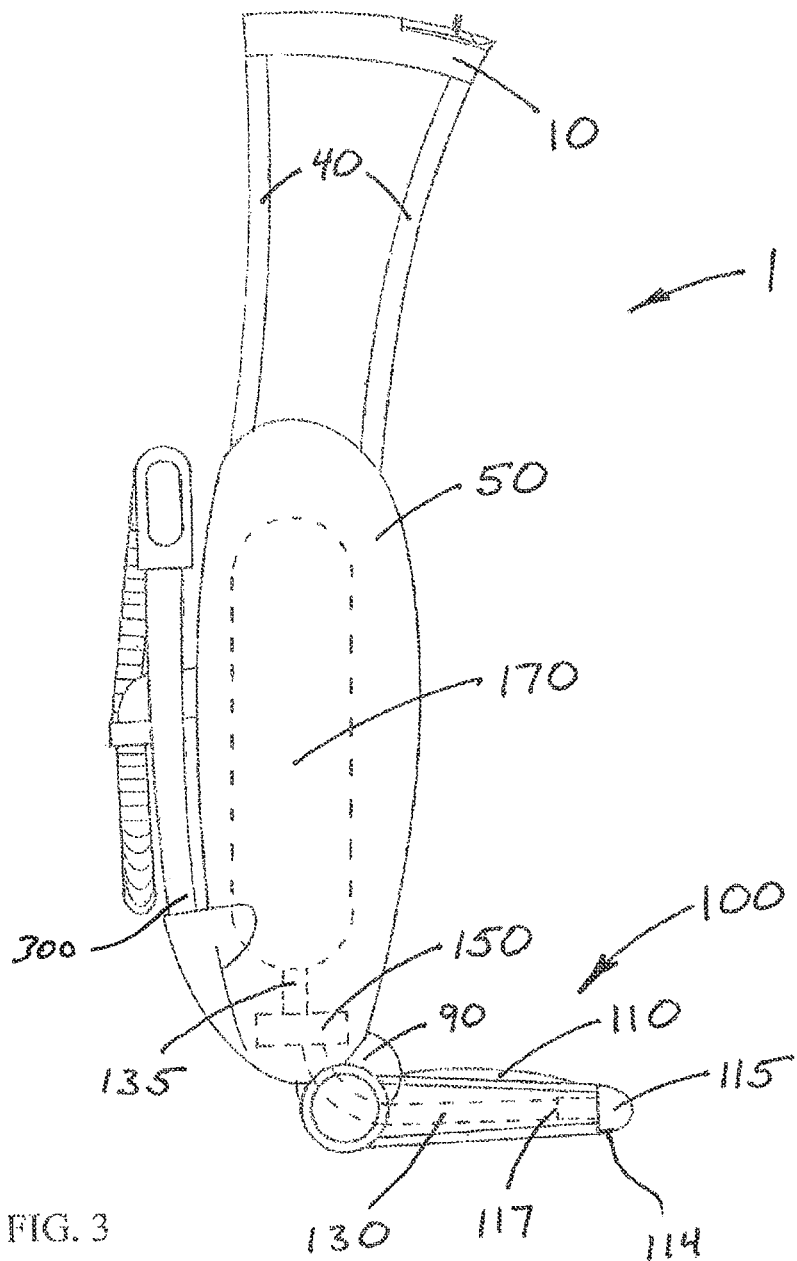
FIG. 3 is an illustration of another embodiment of a surface cleaning device.

FIG. 3 illustrates a non-limiting embodiment in which a suction source 150 is located in the main body 50 above and adjacent to the coupling between the main body 50 and the suction base 100. Air and debris can be sucked into the suction inlet 114 and pass out the discharge opening 117 to the intake conduit 130, which passes through the swivel joint 90 to the suction source 150, and out of the exhaust conduit 135 to the debris receptacle 170, which may be a cyclone-style separator and dirt cup.

In some embodiments, the intake conduit 130 can passes through the swivel joint 90 and operatively engage a distal end of a suction wand 300 operatively connected to and in fluid communication with a suction hose that provides an air path from the suction inlet to an air ingress approximately half to three-quarters of the distance up the outer wall of the dirt cup assembly. The air and debris flows through the cyclonic separator and a filter, and out an egress opening located approximately at the top of the dirt cup. The air path flows through a conduit to the intake of the suction source, which is located in the main body below the dirt cup.

The main body 50 may additionally include a recessed portion 60 into which a dirt cup assembly 90 can be removably secured to the main body during use of the vacuum cleaner 1.

Figure 4:
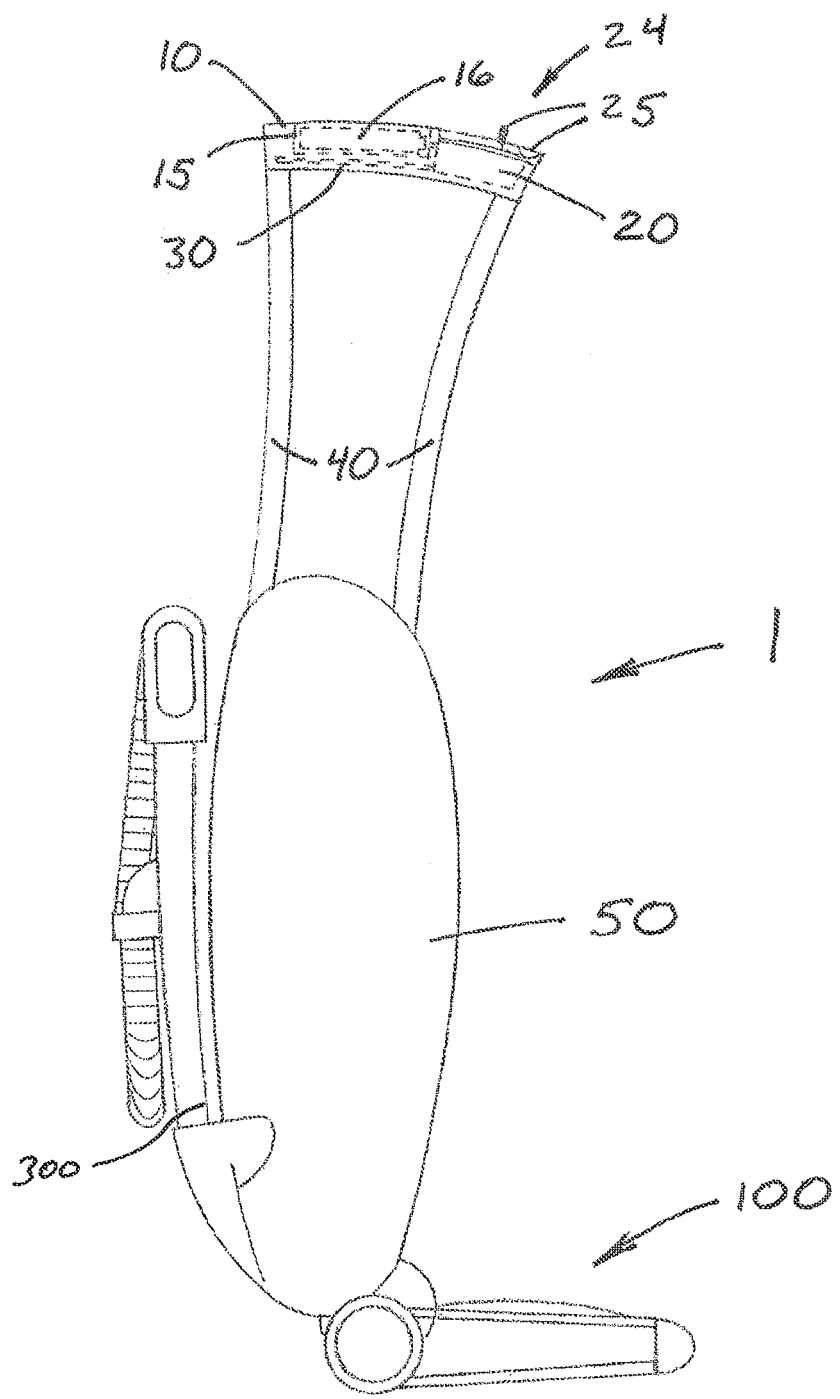
FIG. 4 is an illustration of another embodiment of a surface cleaning device.

FIG. 4 illustrates a non-limiting embodiment of a vacuum cleaner having a first wireless radio frequency communication device 20 and a battery compartment 15 containing a battery 16 in the handle 10 of the vacuum cleaner 1, and a second wireless radio frequency communication device 140 (see FIG. 5) in the suction base 100 in operative association with the power source 250 and the one or more electrical components, including the electric motor of the suction source 150. A control signal circuit 30 may also be provided in the handle and powered by a battery 16 in the battery compartment. A user interface 24 having one or more control features 25 provides for receiving input from a user desiring a particular operation from the vacuum cleaner to the control signal circuit 30. Use of a battery 16 and wireless communication device 20 allows the use of solid structural members for the rigid structural supports 40, instead of requiring hollow support structures to permit the placement of wires to and from the control features 25, which simplifies the design and assembly of the cleaning apparatus. The use of wireless switches can also simplify the design, manufacturing and use of powered attachment components by eliminating the need to provide an electrical transmission path along or within suction wands 300 and pipe or provide electrical connectors between such extension members to the brush or suction device attached at their distal end.

Figure 5:
FIG. 5 is a block diagram showing an embodiment of the wireless communication arrangement of a surface cleaning device.
Figure 5:
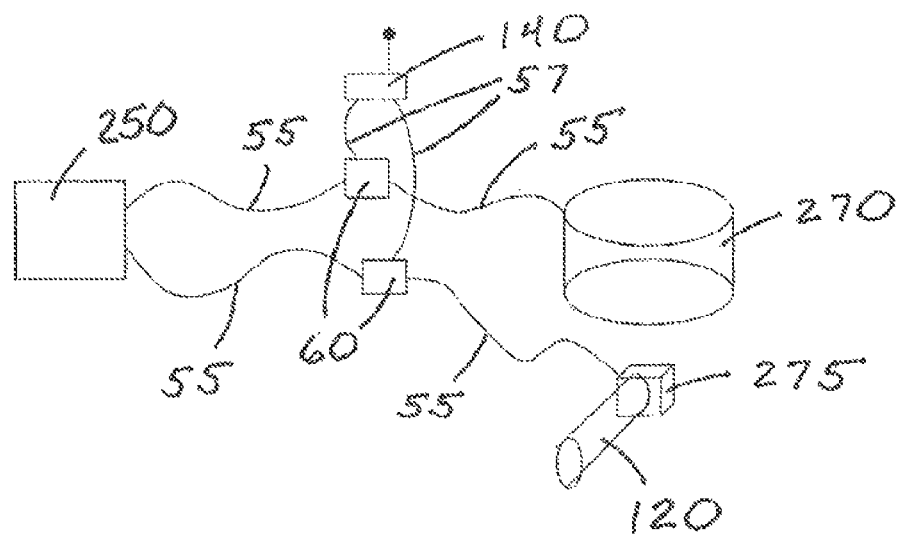

FIG. 5 illustrates a block diagram of the wireless control circuitry having a transmitter or first transceiver 20 that is configured to send control signals to a receiver or second transceiver 140. A power source 250 provides electrical energy to one or more of the various electrical components 270, 280, 290 disposed within the vacuum cleaner or attached as attachments to the vacuum cleaner. Suitable electrical paths 55 provide for transmission of the electricity from the power source 250 to the various electrical components. These components may be electric motors 270, 275 used to drive the suction source 150, beater brush 120, and/or adjust the suction base height; incandescent light bulbs 280, LEDs 290, and/or electroluminescent displays; and the electrical circuits forming the transmitters, receivers, transceivers, sensors, controls circuits and indicators.

The electrical paths 55 may include switches and/or regulators 60 that control the flow of electricity to the components. The switches and/or regulators 60 may be relays or semiconductor components that can have their state changed from conducting to non-conducting by the application of a suitable control signal, including but not limited to a predetermined voltage, a rising edge of a voltage pulse, a falling edge of a voltage pulse, a voltage pulse of a predetermined duration, or a sequence of binary data. The switches and/or regulators 60 may also be transistors, silicon controlled regulators (SCR), thyristors, etc., that can adjust the amount of electricity flowing based upon a control voltage or signal applied to the component as would be known in the art. The receiver or second transceiver 140 may be electrically connected and in operative association with the switches and/or regulators 60 over electrical paths 57.

Control circuits 30, 160 that are configured to generate or read and respond to control signals may be electrically connected and in operative association with the transmitters, receivers, and/or transceivers 20, 140 that provide the wireless radio transmission.

Figure 6:
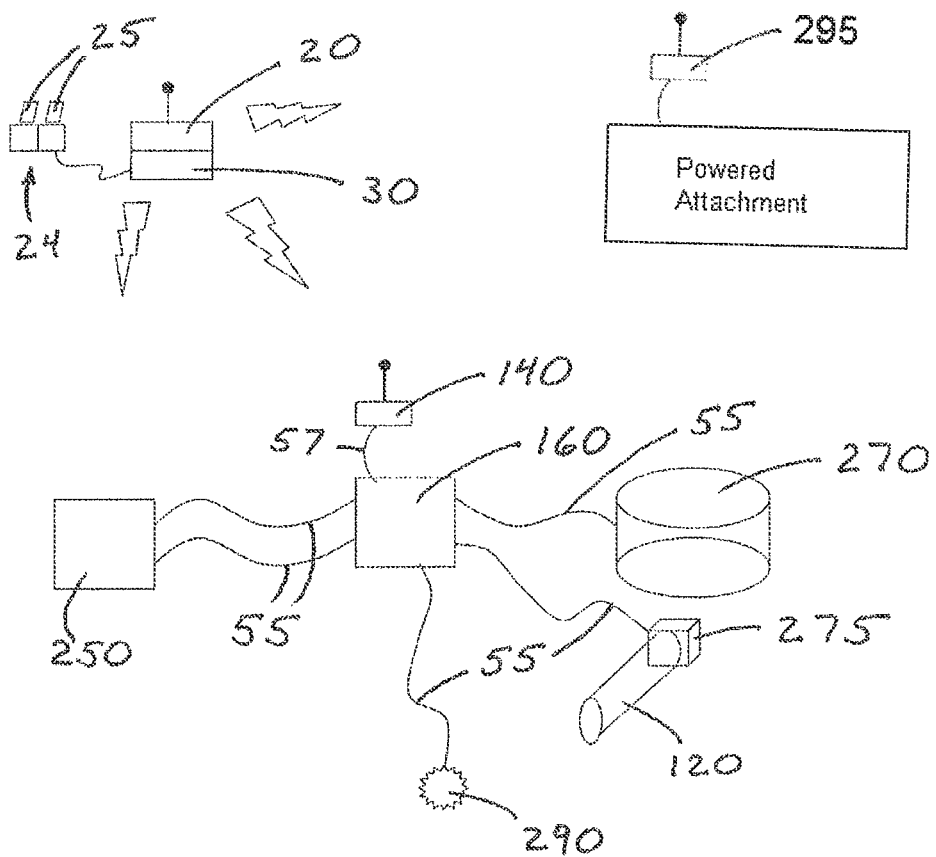
FIG. 6 is a block diagram showing another embodiment of the wireless communication arrangement of a surface cleaning device.

FIG. 6 illustrates control signal circuit 30, which is integrated with the transmitter or transceiver 20, and configured to be electrically connected to and in operative association with a user interface 24 comprising one or more control features 25. The control features may be one or more toggle switches, sliding switches, rocker switches, push-button switches, rotary switches, and/or touch switches. Actuation of a particular control feature 25 on the vacuum by a user can cause the control signal circuit 30 to produce a corresponding wave form that indicates a change in state for a particular electrical component. For example, pressing a button to turn on the power can cause the control circuit to produce a sinusoidal or square wave form of a specific amplitude and frequency, or a series of digital bits that will be interpreted as an instruction by the receiver, power source, or power control circuit to form a circuit to the electric motor driving the suction source. The wave forms may be amplitude modulated, frequency modulated, or phase modulated to transmit the particular control signals by the transmitter or first transceiver 20.

A receiver or transceiver 140 may include circuitry that can recognize a signal of the specific amplitude and frequency and in response provide a voltage or current level to a switch, for example a relay or transistor, to allow electricity to flow from the power source 250 through the switch 60 to a motor 270, 275. The switch 60 may be incorporated in the power control circuit 160 or be a separate component.

FIG. 6 depicts an embodiment in which the switch(es) are incorporated in the power control circuit 160, which thereby controls the flow of electricity over electrical paths 55. Applying a suitable voltage to a relay can trip the relay to complete the electrical path from the power source 250 to the suction source 150, for example, or a sufficient voltage applied to a transistor would allow sufficient power to flow to drive a brush roll motor. A sufficient amount of power or electricity would be an amount above any small leakage current from a solid state device, and would be suitable for obtaining normal operation from the motor.

A multi-pole control feature could be configured to produce a first wave form that can be interpreted to apply a first voltage or current level to a switch to drive the suction motor at a first speed for example, and to produce a second wave form that can be interpreted to apply a second voltage or current level to a switch to drive the suction motor at a second speed. Separate control features can be provided for controlling the rotational speed of an agitator in a similar manner; and even a third control feature 295 (e.g., a third wireless communication device) could be provided for controlling the flow of electricity to a powered attachment that could be coupled to the end of a suction wand 300 or pipe. A remote attachment could also be battery powered and have its own receiver, wherein a separate wireless signal can be sent to the attachment receiver or transceiver to control its mode of operation.

A control signal circuit 30 may be provided for generating more complex control signals, such as predefined digital signals that identify the controller associated with the vacuum cleaner to prevent other wireless radio frequency signals from controlling the operation of the vacuum or interfering with the operation of the vacuum. The use of such an identifying code with each transmitted signal prevents the receiver, power control circuit, and/or power source from misinterpreting stray radio signals as control signals, and changing the operation of the vacuum due to such stray signals. The control signal circuit can also store a library of waveforms associated with particular electrical components and operations, so that when a particular control feature is activated it triggers the transmission of the particular predetermined waveform associated with the component intended to be controlled.

The wireless radio frequency communication device(s) can comprise both a transmitter and a receiver or otherwise provide a combined transmission and reception function using the same circuitry, such as in a transceiver. The combination of the control feature(s) and wireless communication device forms a wireless switch, which can be operatively associated with a power source, such as a battery to function independently from other components and power sources.

The first wireless communication device in the handle of the vacuum could thereby send a control signal to a second communication device that would control the mode of operation of the different electrical components, could provide a feedback signal that acknowledges successful operation by detecting a voltage or current at the particular electrical component and sending a response signal back to the first communication device. The response signal could be used to trigger the illumination of an LED or electroluminescent display indicating proper operation. The response signal could be used for trouble-shooting the operation of the cleaning apparatus, such as where no voltage is detected due to a failed switch or detection of a voltage but no suction or beater bar rotation could indicate a burnt out motor, etc.

Figure 7:
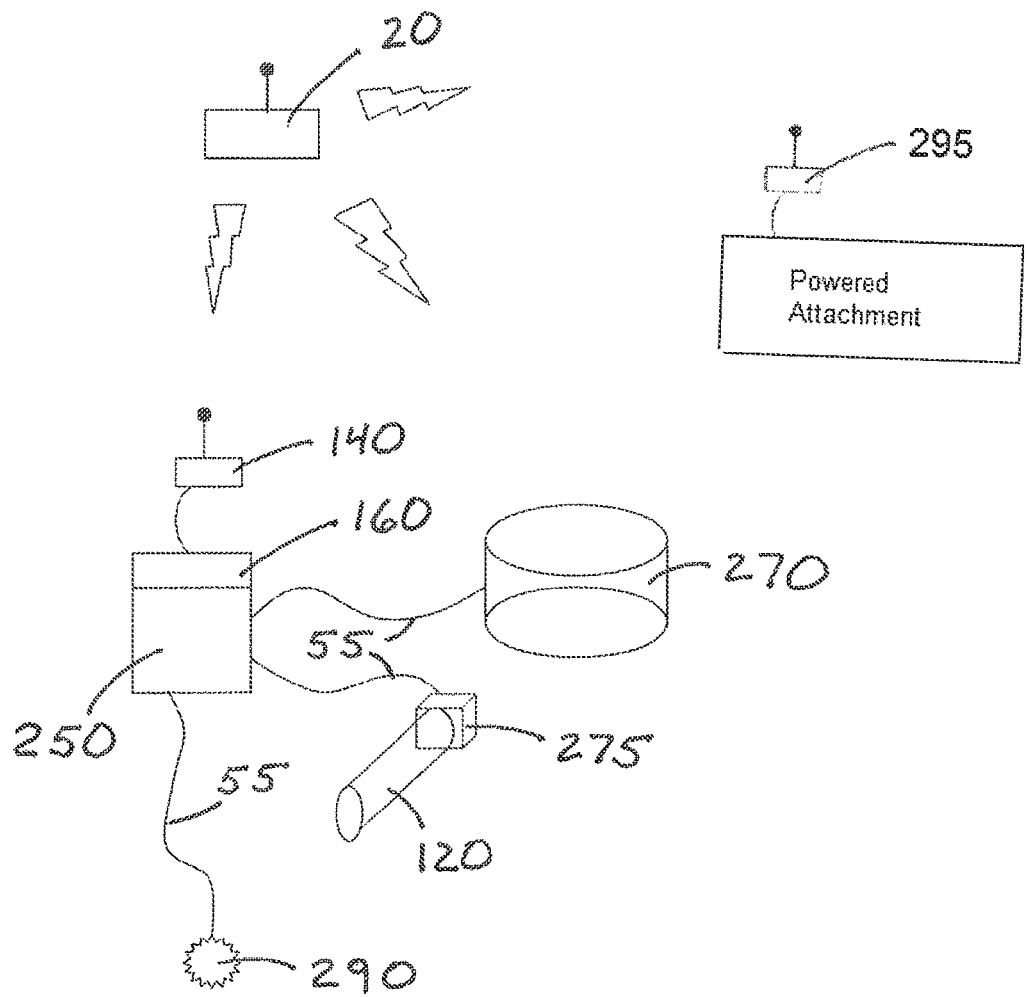
FIG. 7 is a block diagram showing another embodiment of the wireless communication arrangement of a surface cleaning device.

FIG. 7 illustrates a non-limiting embodiment in which the power control circuit 160 is integrated with the power source 250, for example in a switching mode power supply, and is electrically connected and operatively associated with a second wireless communication device 140 to receiver wireless signals from the first wireless communication device 20. The power control circuit would directly control the electrical energy provided from the power source 250 to the different electrical components 270, 275, 290. The first wireless communication device 20 may be electrically connected to a control signal circuit 30 or be configured to generate and transmit control signals on its own.

Figure 8:
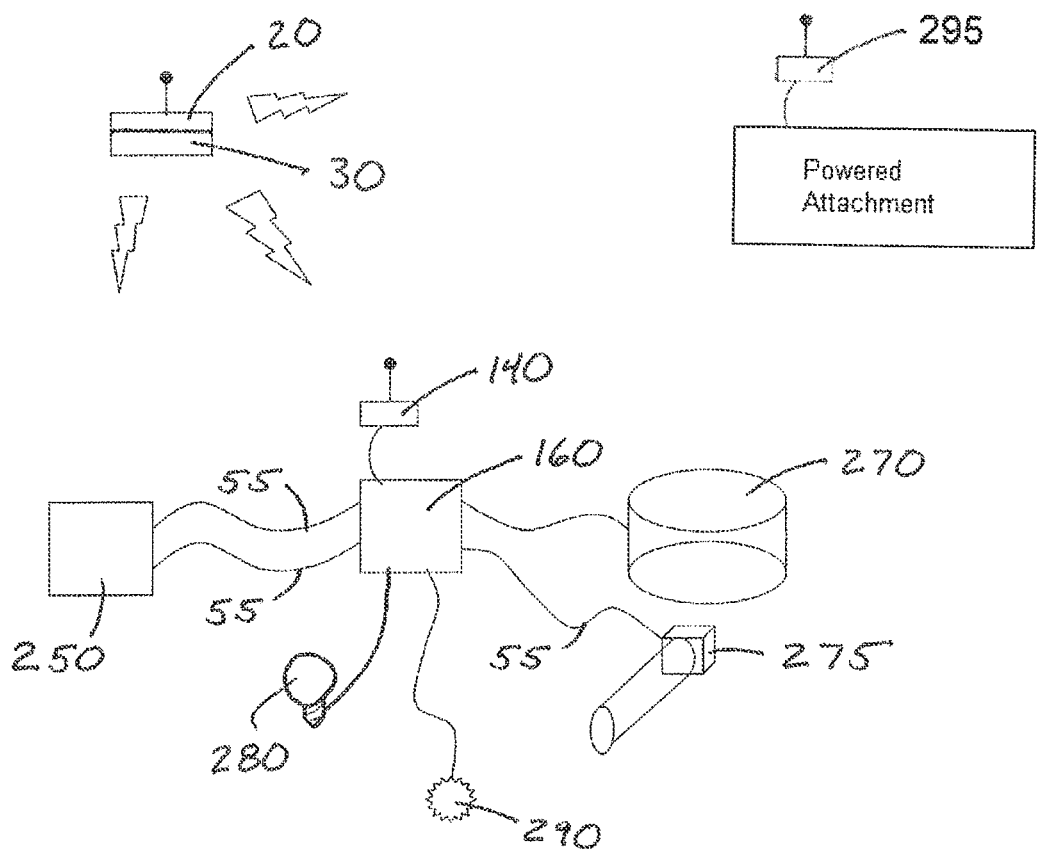
FIG. 8 is a block diagram showing another embodiment of the wireless communication arrangement of a surface cleaning device.

FIG. 8 illustrates an first transceiver 20 integrated with a control signal circuit 30 transmitting control signals and receiving responses to and from the second transceiver 140 operatively associated with power control circuit 160, which is controlling the application of power from a power source 250 to two electric motors 270, 275, an LED 290, and a light bulb 280 located in various sections of a vacuum cleaner 1 over electrical paths 55. The power source 250 may receive AC power from a plug configured to interact with a standard socket, such as 120 volt home wall socket, or the power source 250 may receive DC electricity from a battery or rectified circuit, and convert the received electrical power into electrical power having the proper voltage and current characteristics to drive the various electrical components for transmission to the power control circuit over one or more electrical paths 55. The power source may be connected to an electrical cord with a suitable plug attached to provide an electrical path to the power source.

In a first non-limiting example a wireless control having controller circuitry that generates different digital control signals depending on the positions of a single-pole, double-throw switch, wirelessly transmits a control signal over a particular radio frequency to a receiver. The receiver receives the transmitted signal and generates a voltage that trips a relay to allow electricity to flow from a power source to an electric motor that drives the blower to generate the suction for a vacuum cleaner.

In this particular example, the first position of the switch on the controller causes the control to generate a signal that is received and interpreted to trigger only the relay controlling power to the suction generating motor. When the single-pole, double throw switch is moved to the second position, the controller generates a signal that is received and interpreted to trigger both the relay controlling the flow of electricity to the suction motor and the relay controlling the flow of electricity to the beater-brush motor. This allows two separate motors to be controlled independently so that suction can be generated without causing the beater-brush to rotate.

In other examples, a light can be interconnected with the electrical supply to the beater-brush motor, so a headlight on the vacuum only comes on when the beater-brush is activated. A light may also be positioned in the dirt cup, and electrically connected so it lights up when there is power to the suction source.

A non-limiting example of a preferred embodiment will now be described in reference to the apparatus depicted in FIG. 1.

As used herein, "cleaning surface", "surface" and "cleaning medium" are used interchangeably to include any area, region, substrate, surface and other medium that can be acted upon by cleaning apparatus. Examples of "cleaning surfaces" and "cleaning media" include, but are not limited to, carpets, floors (including floors fabricated from hardwood, linoleum, ceramic, marble and other complementary and equivalent materials), mattresses (including mattresses for humans and pets), furniture (including fully or partially upholstered furniture, wooden furniture, metal furniture, patio and sunroom furniture and the like), accessories (including textile accessories such as pillows, throw pillows and seat cushions), drapery, walls and ceilings (including walls and ceiling made from drywall, having textured and/or painted surfaces, incorporating wainscoting and having a covering secured thereon), stuffed animals, textiles and other surfaces and media. The term "carpet" as used herein includes all textile floor coverings, including but not limited to those having fibers (e.g., whether looped, tufted, hooked, needle felt, woven or of other design), indoor or outdoor, of natural or synthetic materials, wall-to-wall textiles or roll goods.

In a non-limiting example of an embodiment of the invention, a wireless radio frequency transmitter, a controller circuit, and a mechanical switch are integrated on a printed circuit board (PCB) located in the partially hollow handle of a vacuum cleaner with a replaceable battery to provided power. A wireless radio frequency receiver is integrated with a power controller including at least a microprocessor and a triac on a PCB in the base of the vacuum cleaner. The transmitter and receiver have the same configuration and work on the same frequency. The transmitter and receiver operate on a frequency of 433 MHz, and use a Gaussian frequency-shift keying (GSFK) modulation scheme to limit the signals spectral width and to transmit digital information. Each handle transmitter uses a unique serial number for identification. A manufacturing code may also be used to identify the transmitter to the receiver.

The controller integrated with the transmitter provides two codes to the transmitter as a payload for transmission to the receiver to identify the controller and transmitter. The microprocessor in the receiver controller decodes the two codes using software to confirm the instructions have come from the paired transmitter. The coding is used to avoid cross-talk between multiple transmitters. The codes can be a manufacturer code and a serial code. A transmission protocol is used to establish communication between the transmitter and receiver, and to encrypt and communicate the codes and instruction data in 8-bit words, where the protocol is one developed for the current application. A cyclic redundancy check (CRC) is done on the communicated data. The receiver microprocessor interprets the digital data and decides if a valid manufacturer code and serial number was transmitted with the instruction. The payload data includes information for the speed setting of the one or more motors. The microprocessor monitors the 60 hz power and triggers the triac at different phase angles to vary the voltage and motor speed.

Examples of different particular embodiments of each of the various components and arrangements, as well as different embodiments of the overall cleaning apparatus have been illustrated and described above. The examples illustrate particular combinations of controls and electrical component design features, however other combinations and arrangements of the various inventive features can be implemented, and are intended to be encompassed within the spirit and scope of the present invention. Furthermore, variations and modifications other than those illustrated and described will be apparent to persons of ordinary skill in the art. It is intended that all such embodiments, examples, variations, combinations, and modifications thereon are meant to be encompassed within the spirit and scope of the present invention as set forth in the following claims.

What is claimed is:

1. A vacuum cleaner comprising:
   a main body including a handle and a first wireless radio frequency communication device located within at least one of the main body and the handle;
   a suction source;
   a suction inlet in fluid communication with the suction source;
   a discharge opening in fluid communication with the suction source;
   a power source selectively electrically connected to the suction source;
   a second wireless radio frequency communication device in communication with the first wireless radio frequency communication device to control at least the application of power to the suction source, wherein the first wireless radio frequency communication device sends wireless signals to the second wireless radio frequency communication device to control the selective application of power to the suction source;
   a control signal circuit in electrical communication with the first wireless radio frequency communication device to generate control signals for transmission from the first wireless radio frequency communication device to the second wireless radio frequency communication device;
   an electrical component electrically connected to the power source; and
   a power control circuit that receives control signals from the second wireless radio frequency communication device over an electrical path and forms electrical circuits between the power source and the electrical component.

2. The vacuum cleaner of claim 1, wherein the handle includes a battery compartment for receiving a replaceable battery, wherein insertion of a battery into the battery compartment electrically connects the battery to the first wireless radio frequency communication device which thereby receives a supply of power separate from the power source.

3. The vacuum cleaner of claim 1, further comprising a dirt cup removably attached to the main body and in fluid communication with the suction source, and wherein the suction source and second wireless radio frequency communication device are located within the main body.

4. The vacuum cleaners of claim 3, further comprising an air path passing from the suction inlet to the dirt cup and then to the suction source.

5. The vacuum cleaner of claim 1, which further comprises a debris receptacle selectively attached to the main body and in fluid communication with the suction source.

6. The vacuum cleaner of claim 5, wherein an air path passes from the suction inlet to the suction source and then to the debris receptacle.

7. The vacuum cleaner of claim 1, wherein the power control circuit selectively applies power to the electrical component in response to a signal received from the first wireless radio frequency communication device.

8. The vacuum cleaner of claim 1, wherein the power control circuit includes a switch that separately controls the formation of an electrical circuit between the power source and the electrical component to supply sufficient power to drive the electrical component.

9. The vacuum cleaner of claim 1, wherein the power control circuit is integrated with the power source to selectively apply power to the electrical component in response to a signal received from the first wireless radio frequency communication device.

10. The vacuum cleaner of claim 1, wherein the power control circuit and the power source is a switching mode power source.

11. The vacuum cleaner of claim 1, wherein the electrical component is selected from a group consisting of electric motors, incandescent lights, LEDs, and sensors.

12. The vacuum cleaner of claim 1, wherein the first wireless radio frequency communication device and the second wireless radio frequency communication device communicate using a communication protocol, and the control signal circuit generates digital instructions having information to specifically identify the control signal circuit that is transmitted by a transmitter over a particular radio frequency band.

13. The vacuum cleaner of claim 1, wherein the first wireless radio frequency communication device provides input to the control signal circuit to control a mode of operation of the vacuum cleaner.

14. The vacuum cleaner of claim 1, wherein the first wireless radio frequency communication device controls the operation of a component selected from a group consisting of: at least one of an electric motor speed, a brush roll rotation, a light, an LED, and air path diverter positioning.

15. The vacuum cleaner of claim 1, wherein the control signal circuit generates unique digital instruction codes to control the operation of a component selected from a group consisting of: an electric motor speed, brush roll rotation, a light, an LED, and air path diverter positioning.

16. The vacuum cleaner of claim 15, wherein the instruction codes are communicated from the first wireless radio frequency communication device to the second wireless radio frequency communication device to selectively apply power to the electrical component in response to signals received from the first wireless radio frequency communication device, and the second wireless radio frequency communication device sends a response to the first wireless radio frequency communication device acknowledging the application of power to the electrical component.

17. The vacuum cleaner of claim 1, further comprising a third wireless radio frequency communication device that provides control signals to the power source over an electrical path, wherein the second wireless radio frequency communication device and the third wireless radio frequency communication device communicate with the first wireless radio frequency communication device over different radio frequency bands, and the second wireless radio frequency communication device receives control signals for a subset of electrical components different and separate from a subset of electrical components that selectively receive power in response to signals received at the third wireless radio frequency communication device.

18. The vacuum cleaner of claim 17, wherein the subset of electrical components receiving control signals over the second wireless radio frequency communication device includes a suction motor, a headlight, and a brushroll motor, and wherein the subset of electrical components receiving control signals over the third wireless communication device includes an attachment device affixed to a distal end of a suction wand.

19. A vacuum cleaner comprising:
a main body including a handle and a first wireless radio frequency communication device located within at least one of the main body and the handle;
a suction source;
a suction inlet in fluid communication with the suction source;
a discharge opening in fluid communication with the suction source;
a power source selectively electrically connected to the suction source;
a second wireless radio frequency communication device in communication with the first wireless radio frequency communication device to control at least the application of power to the suction source, wherein the first wireless radio frequency communication device sends wireless signals to the second wireless radio frequency communication device to control the selective application of power to the suction source;
a control signal circuit in electrical communication with the first wireless radio frequency communication device to generate control signals for transmission from the first wireless radio frequency communication device to the second wireless radio frequency communication device;
an electrical component; and
a power control circuit integrated with the power source to receive control signals over an electrical path from the second wireless radio frequency communication device, and to selectively apply power to the electrical component in response to signals received from the first wireless radio frequency communication device.

20. A vacuum cleaner comprising:
a main body including a handle and a first wireless radio frequency communication device located within at least one of the main body and the handle;
a suction source;
a suction inlet in fluid communication with the suction source;
a discharge opening in fluid communication with the suction source;
a power source selectively electrically connected to the suction source;
a second wireless radio frequency communication device in communication with the first wireless radio frequency communication device to control at least the application of power to the suction source, wherein the first wireless radio frequency communication device sends wireless signals to the second wireless radio frequency communication device to control the selective application of power to the suction source;
a control signal circuit in electrical communication with the first wireless radio frequency communication device to generate control signals for transmission from the first wireless radio frequency communication device to the second wireless radio frequency communication device;
wherein the first wireless radio frequency communication device and the second wireless radio frequency communication device communicate using a communication protocol, and the control signal circuit generates digital instructions having information to specifically identify the control signal circuit that is transmitted by a transmitter over a particular radio frequency band.

21. A vacuum cleaner comprising:
a main body including a handle and a first wireless radio frequency communication device located within at least one of the main body and the handle;
a suction source;
a suction inlet in fluid communication with the suction source;

a discharge opening in fluid communication with the suction source;

a power source selectively electrically connected to the suction source;

a second wireless radio frequency communication device in communication with the first wireless radio frequency communication device to control at least the application of power to the suction source, wherein the first wireless radio frequency communication device sends wireless signals to the second wireless radio frequency communication device to control the selective application of power to the suction source;

a control signal circuit in electrical communication with the first wireless radio frequency communication device to generate control signals for transmission from the first wireless radio frequency communication device to the second wireless radio frequency communication device;

wherein the first wireless radio frequency communication device provides input to the control signal circuit to control a mode of operation of the vacuum cleaner.

* * * * *